United States Patent Office 3,575,724
Patented Apr. 20, 1971

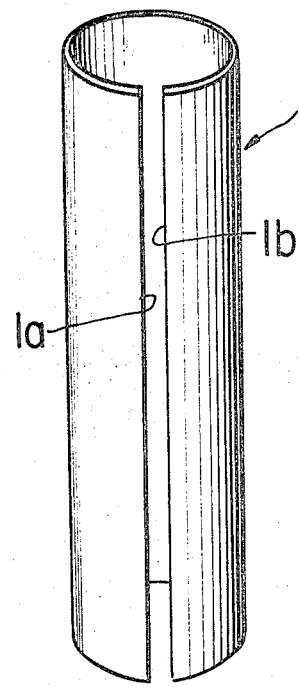
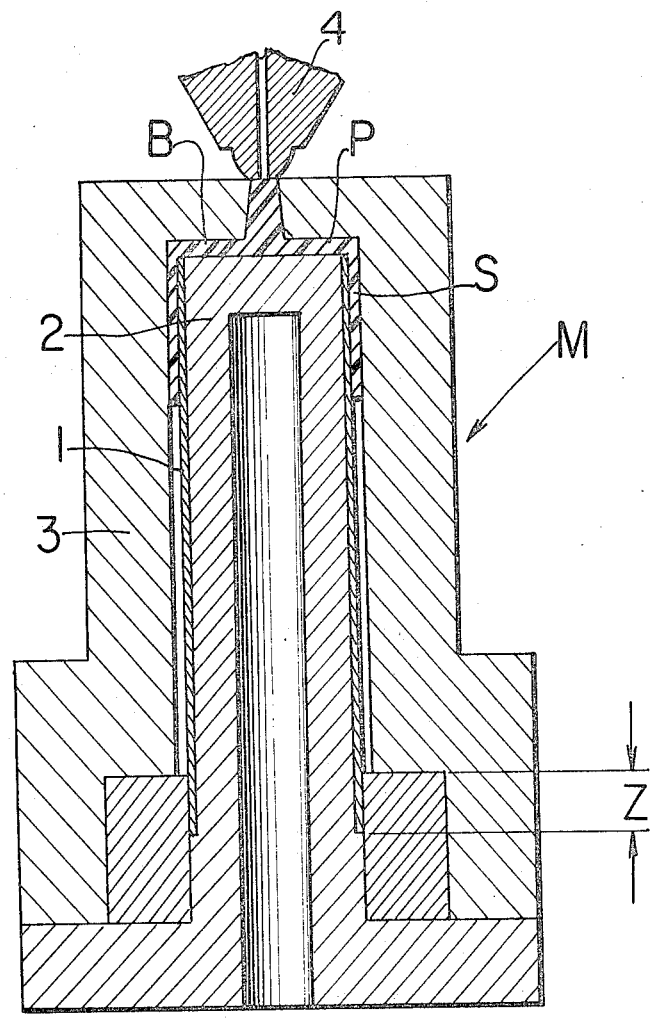

3,575,724
CYLINDRICAL PRIMARY DRY CELLS
Jean Firmin Jammet, Poitiers, and François Michel Joyeux, Sourdeau Chasseneuil, France, assignors to Societe des Accumulateurs Fixes et de Traction (Societe Anonyme), Romainville, France
Filed June 4, 1969, Ser. No. 830,359
Claims priority, application France, Nov. 12, 1968, 173,274
Int. Cl. H01m 21/00
U.S. Cl. 136—107                           2 Claims

ABSTRACT OF THE DISCLOSURE

Cylindrical primary dry cell including a cylindrical negative electrode embracing a depolarizer mass provided with a conductive rod serving as a positive electrode, the outer end of said rod protruding from the closure of the cell and optionally covered by a metal cap, the negative electrode being a curved metallic sheet of zinc or magnesium whose longitudinal edges do not meet, the outer surface of said sheet, except for an annular zone, bearing a synthetic non-conductive casing molded thereon and filling the space between said edges and which also serves as a bottom closure for such cell, a plastic cover mounted in the open end of said curved metallic sheet and being sealing pressed against the inner wall of said sheet in the region of its uncoated zone by a metal ring of substantial L-shaped half-section mounted thereon and whose diameter is reduced after mounting, the cover also having an escape valve arrangement for gases evolved during use of the cell.

BRIEF SUMMARY OF INVENTION

The invention relates to primary dry cells usually of cylindrical shape and more particularly to cells of the type comprising a generally cylindrically shaped negative electrode cooperating with a depolarizer mass therein which is provided with a conductive rod used as a positive electrode, the end of the rod protruding from the cell being optionally covered with a metal cap constituting the positive terminal of the cell.

U.S. Pat. No. 2,346,640 of Apr. 18, 1944, discloses a method for sealing primary dry cells of the above-mentioned type by coating them except on the output terminals with a casing made by molding a thermoplastic material thereon in situ, said material being directly applied on the zinc cup constituting the negative electrode and thus constituting the casing, the bottom of the cell and the cap, however, being left bare.

U.S. Pat. No. 2,710,307 of June 7, 1955 also discloses a method for forming the coating of sealed primary dry cells of the above-mentioned type by injection of a thermoplastic material in a mold provided with a zinc lining and at one end with a transverse zinc strip which will constitute a negative output terminal, in such a way that the said zinc parts are embedded in the synthetic material which will constitute the casing.

Such method may be used when the negative electrode is constituted by a metal sheet, curved so that its edges do not quite meet, as shown, for instance, in the French Pat. No. 973,083, filed on Oct. 7, 1948.

Principal objects and features of the present invention are to provide a particularly advantageous solution to the problem of making and sealing cylindrical primary dry cells comprising a synthetic casing molded over the negative electrode.

The invention relates to a cylindrical primary dry cell of the type comprising a cylindrical negative electrode cooperating with a depolarizing mass provided with a conductive rod used as a positive electrode, the end of the rod protruding from the cell and being optionally covered with a metal cap constituting the positive terminal characterized by the fact that the negative elecrode constituted by a curved metal sheet is coated on its outer surface except for an annular zone at one end with a synthetic casing which latter also constitutes a bottom for the cell, the non-coated zone of the electrode serving as the cell's negative output terminal.

Advantageously the synthetic casing is molded over the negative electrode.

According to an embodiment of the invention, the non-coated zone of the negative electrode is closely pressed against a plastic cover, thus hermetically closing the cell between the rod and the negative electrode, as by means of a metal ring with an L-shaped half-section.

Advantageously, the said metal ring is fixed in its place after mounting by a diameter reducing operation, the part of the negative electrode on which it has been applied having thereafter an outer diameter slightly smaller than that of the remainder of the said electrode.

According to a further characteristic of the invention, the longitudinal edges of the curved metal sheet constituting the negative electrode do not quite meet.

Such an embodiment is particularly advantageous when the negative electrode is made of magnesium. The manufacture of magnesium cups raises many problems since the impact extrusion of magnesium is a difficult operation; graphite powder must be used in such operating and thereafter be washed off, e.g. by means of acetic acid. However, when according to the invention the negative electrode is constituted by a curved metal sheet whose longitudinal edges do not quite meet, no extrusion operation is necessary.

Other objects, features and characteristics of the invention wil become apparent from the following description and in the annexed drawings in which:

FIG. 1 is a perspective view of a negative electrode according to the invention;

FIG. 2 is a diagrammatic sectional view of the device used for molding the synthetic casing onto the negative electrode;

DETAILED DESCRIPTION

Figure 3:
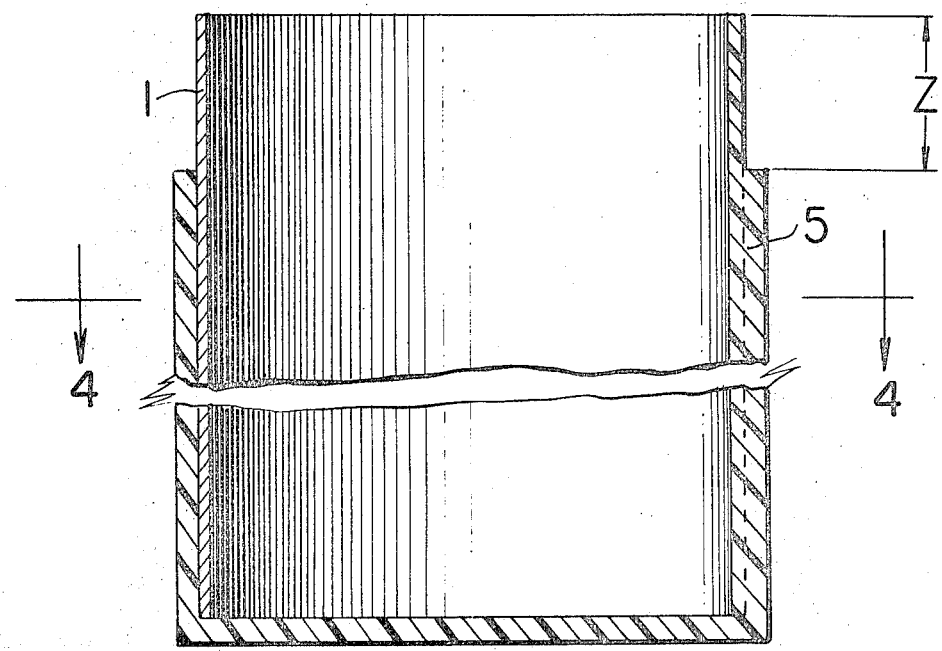
FIG. 3 is a diagrammatic sectional view of the negative electrode provided with the molded casing, taken along line 3—3 of FIG. 4.

Referring now to the drawings and first to FIG. 1, reference numeral 1 denotes a metallic sheet that has been curved or shaped into generally cylindrical tubular form with open ends and whose longitudinal edges 1a and 1b are unjoined and somewhat spaced apart. This shaped tube 1 is intended to serve as the negative electrode of the cell and may be of any suitable metal such as zinc, magnesium or their alloys.

After an eventual cleaning of conventional nature, the shaped tube 1 is mounted on the central core 2 of an injection mold M as seen in FIG. 2.

After the mold M has been closed by cover part 3, the synthetic material P which will constitute the casing of the cell by partly coating the outer surface of the negative electrode tube is injected into the annular spaces S and B within the closed mold M through the injection nozzle 4.

Figure 4:
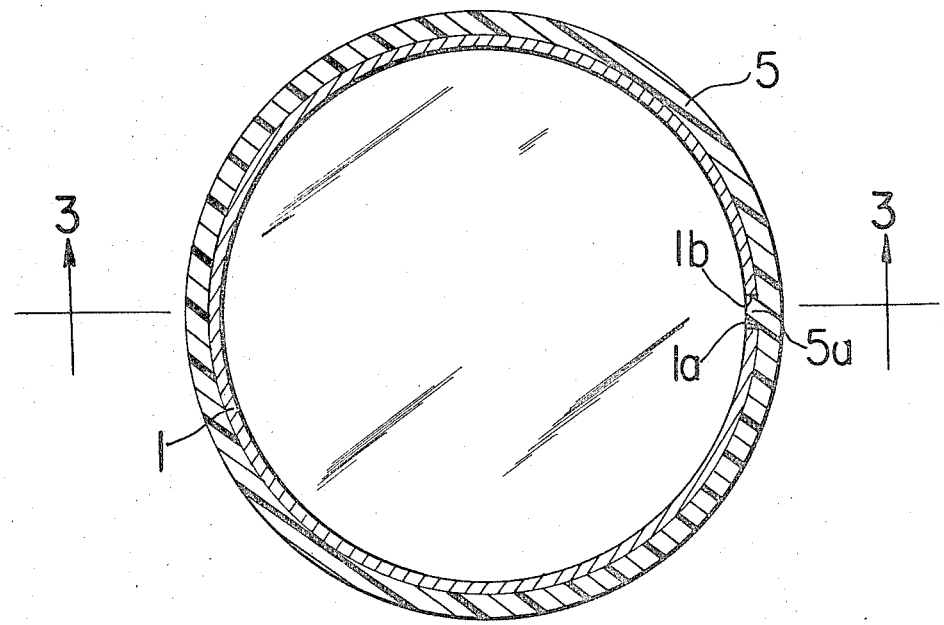
FIG. 4 is a sectional view of FIG. 3 along line 4—4 of FIG. 3.

The molding operation is shown diagrammatically in FIG. 2 during the injection of the synthetic material P. It fills the spaces S and B forming a plastic coating S on the major length of the tube 1, also spanning one end of the tube by portion B so that according to the invention the molded casing 5 includes also a bottom for the cell and also covers the negative electrode 1 for its entire length except for a zone Z at the other end of the tubular electrode 1. As shown in FIGS. 3 and 4, the synthetic material also fills the space or gap between the longitudinal edges 1a and 1b of sheet 1 on the whole height of said tube 1 at 5a, thus creating a resilient seal which enables the cell to bear some dilatations.

FIG. 3 is a vertical sectional view taken through the filled gap between the edges 1a and 1b of tubular sheet 1.

Figure 5:
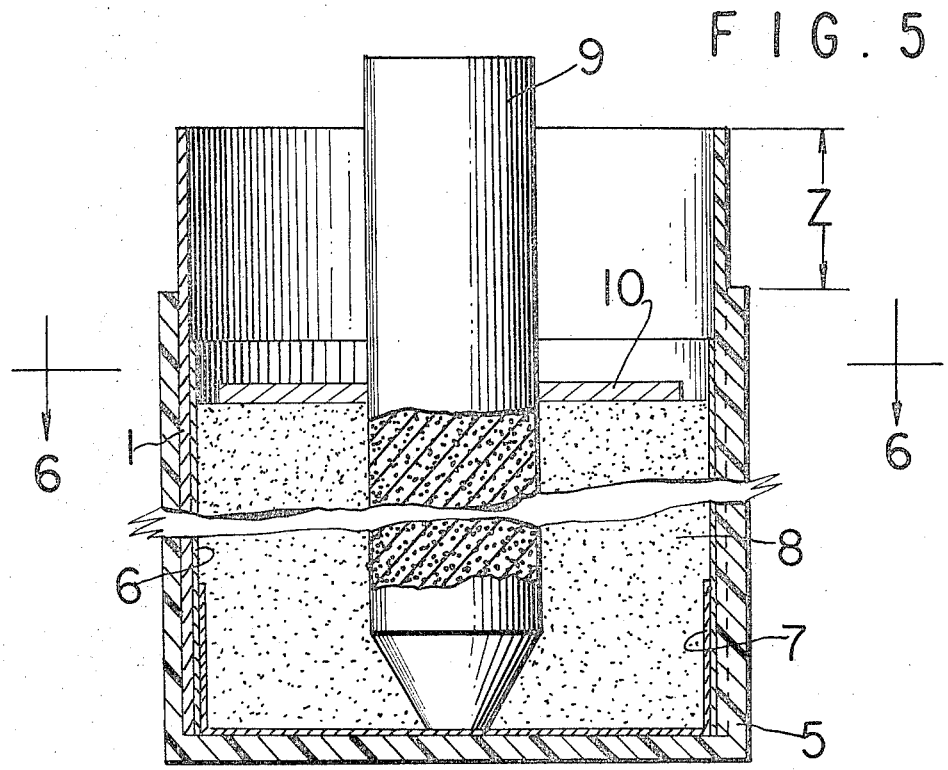
FIG. 5 is a diagrammatic sectional view of the cell after filling with the active contents and prior to closing its still open end.
Figure 6:
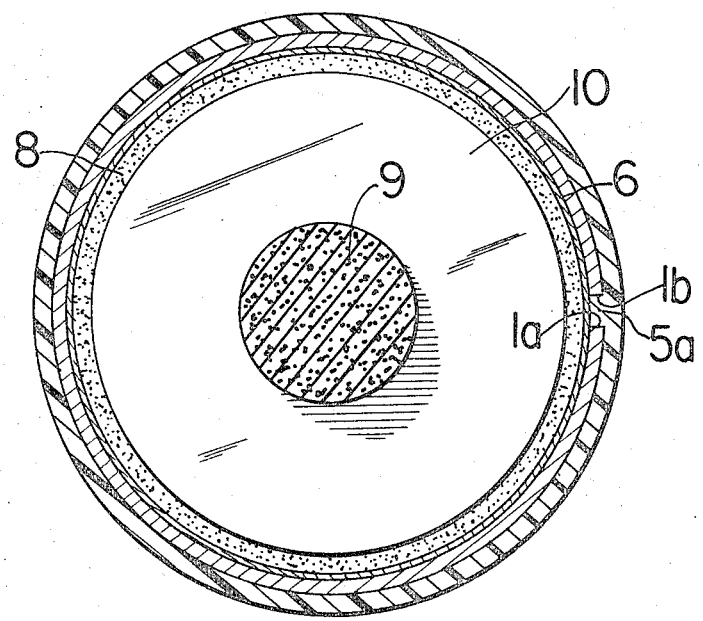
FIG. 6 is a sectional view of FIG. 5 along line 6—6.

As seen in FIGS. 5 and 6, the tubular electrode 1 coated with synthetic plastic casing 5 after removal from the mold is then provided with a tubular separator 6 and a centering shallow cup 7. Separator 6 as may be seen clearly in FIGS. 5 and 7 terminates short of the zone Z, may be constituted by a rolled-up sheet already impregnated or coated with conventional electrolyte. The center ring cup 7 made, e.g. of paper or the like, is more especially intended to hold the separator 6 in its mounted position internally of tube 1. Thereafter, a sausage-shaped depolarizer mass or mix 8 is inserted in the thus created space within said tube 1. A disk 10 perforated at its center and made, e.g. of cardboard or synthetic material is then positioned over the depolarizer mass. Thereafter, a conductive rod 9 of carbon or the like is driven into the mass along its axis. This operation expands the mass outwardly, thus pushing it into intimate contact with the inner wall of separator 6 and further pushes separator 6 into intimate contact with the inner wall of the negative tubular electrode 1.

After the carbon rod 9 has been driven home to the position shown in FIG. 5, a selected pressure is applied to disk 10 thus effecting a further compression of the depolarizer mass 8.

Figure 7:
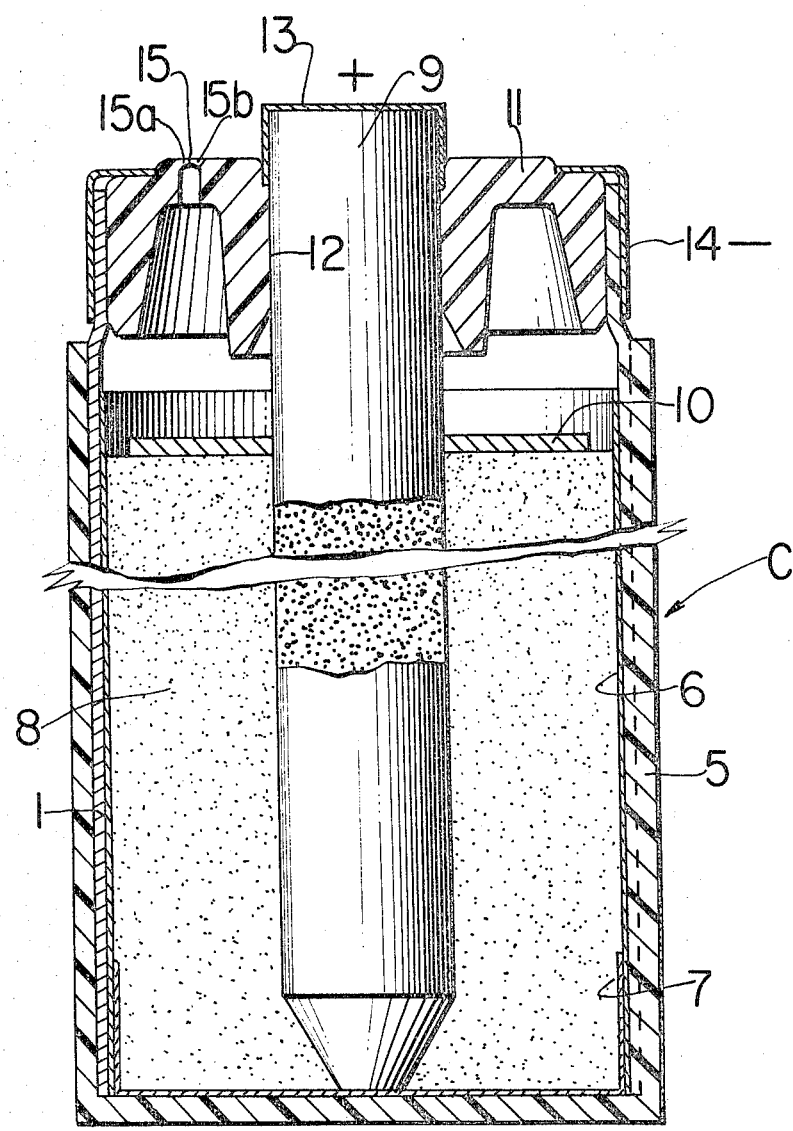
FIG. 7 is a diagrammatic sectional view of the finished cell.

Subsequently, a plastic cover 11 (see FIG. 7) is mounted in the uncoated still open end of tubular electrode 1 to hermetically close the cell C between the rod 9 and said negative electrode 1. This cover 10 is provided with an annular internally extending flange 12 which closely engages the carbon rod 9 whose protruding end is then provided optionally with a metal cap 13 which will constitute the positive output terminal of the cell. The uncoated portion Z of the negative electrode 1 which was not coated with the synthetic plastic of casing 5 is then pressed against the side wall of plastic cover 11 as by means of a metal ring 14 which as shown in FIG. 7 has an L-shaped half section.

After mounting of said ring 14 according to the invention, it is set and held in place by reduction of its diameter. As a consequence, the part Z of the electrode on which it has been applied possesses thereafter a diameter slightly smaller than that of the remainder of the tubular electrode. The plastic cover 11 is provided with at least one aperture or the like 15 through which gases evolved in the cell during discharge may escape when they have reached a given overpressure in the cell. This aperture 15 constitutes a valve since air cannot come into the cell through it from outside. The lips 15a and 15b of this aperture are closed by the compression applied to the upper part of cover 11 by the ring 14 so that they can play the part of a valve, preventing ingress of air while permitting egress of gases evolved in the cell during use.

It would also be possible to provide the cover 11 with a thinner wall on at least part of its top so that gases evolved in the cell could diffuse outwards on occurrence of undesirable internal overpressures.

The ring 14 which is in intimate contact with the uncoated zone Z of the tubular electrode 1 constitutes the negative output terminal of the cell and may be made, e.g. of tin-plated steel sheet.

If then several cells are to be series- or parallel-connected, suitable connections can easily be welded or soldered to this ring 14. This is very advantageous when the negative electrode is made of magnesium since welding or soldering is always difficult with magnesium.

It is well understood that the invention is not limited to the described and represented embodiments which have only been given as examples. More particularly, modifications may be effected, dispositions may be changed and the described means replaced by equivalent means without departing from the scope of the claims hereinafter presented.

What is claimed is:

1. A primary dry cell comprising a tubular negative electrode, a depolarizer mass embraced by said electrode, a conductive member embedded in the mass, an end of which member protrudes from the cell and serves as a positive electrode, said negative electrode being tubular in shape with arcuately spaced-apart longitudinal edges defining a longitudinal slot, an insulative casing filling said slot and covering the major outer portion of the outer side wall of the negative electrode and spanning one end thereof to constitute the bottom of the cell, an outer zone of said negative electrode adjacent its upper end remaining uncovered, said uncovered zone serving as the negative terminal of said cell, separator material containing electrolyte surrounding said depolarizer mass but terminating short of the uncovered zone, a restricting conductive connecting ring mounted on said uncovered zone of said negative electrode, an insulative cover positioned within the uncovered zone of said negative electrode and constituting a sealing closure for its contents, and valving means in said insulative cover for relief of gas pressure build-up within said cell.

2. A primary dry cell comprising a tubular negative electrode, a depolarizer mass embraced by said electrode, a conductive member embedded in the mass, an end of which member protrudes from the cell and serves as a positive electrode, said negative electrode being tubular in shape with arcuately spaced-apart longitudinal edges defining a longitudinal slot, an insulative casing filling said slot and covering the major outer portion of the outer side wall of the negative electrode and spanning one end thereof to constitute the bottom of the cell, an outer zone of said negative electrode adjacent its upper end remaining uncovered, said uncovered zone serving as the negative terminal of said cell, separator material containing electrolyte surrounding said depolarizer mass but terminating short of the uncovered zone, a restricting conductive connecting ring mounted on said uncovered zone of said negative electrode, and an insulative cover positioned within the uncovered zone of said negative electrode and constituting a sealing closure for its contents.

References Cited

UNITED STATES PATENTS

| | | | |
|---|---|---|---|
| 224,343 | 2/1880 | Maynard | 136—121 |
| 1,366,191 | 1/1921 | Koretzky et al. | 136—113 |
| 1,366,298 | 1/1921 | Teitelbaum | 136—178 |
| 2,524,668 | 10/1950 | Keller | 136—107X |
| 2,262,836 | 11/1941 | Deibel | 136—107 |
| 2,710,307 | 6/1955 | Szundy | 136—106 |
| 3,168,420 | 2/1965 | Jammet | 136—107X |
| 3,420,714 | 1/1969 | Knight | 136—107 |

WINSTON A. DOUGLAS, Primary Examiner

A. SKAPARS, Assistant Examiner

U.S. Cl. X.R.

136—128, 135R